United States Patent [19]
Lang

[11] 3,899,070
[45] Aug. 12, 1975

[54] TRACTION-DEMAND POWER DRIVE UNIT

[75] Inventor: John M. Lang, Bellevue, Wash.

[73] Assignee: The Boeing Company, Seattle, Wash.

[22] Filed: June 27, 1973

[21] Appl. No.: 374,196

[52] U.S. Cl. .......................... 198/127 R; 244/137 R
[51] Int. Cl.² ........................................ B65G 13/02
[58] Field of Search .................. 198/127 R, 127 RE; 244/118 R, 137 R

[56] References Cited
UNITED STATES PATENTS

| | | | |
|---|---|---|---|
| 3,447,665 | 6/1969 | Egeland et al. ..................... | 198/127 |
| 3,631,964 | 1/1972 | Hinman et al. ..................... | 198/127 |
| 3,698,539 | 10/1972 | Schwarzbeck .................. | 198/127 R |
| 3,737,022 | 6/1973 | Deneefe et al. ................. | 198/127 R |

Primary Examiner—Evon C. Blunk
Assistant Examiner—Joseph E. Valenza
Attorney, Agent, or Firm—Bernard A. Donahue; Glenn Orlob

[57] ABSTRACT

A reversible, self-adjusting powered drive roller mechanism for moving cargo containers of various weights along a ramp. In the preferred embodiment shown, the device has a unique pivoting linkage which positions the drive roller in its lowermost position for the handling of a light container and automatically raises the roller as required for a heavier container, causing the roller to assume a greater portion of the total weight of the container and to apply a greater traction force without slipping.

7 Claims, 6 Drawing Figures

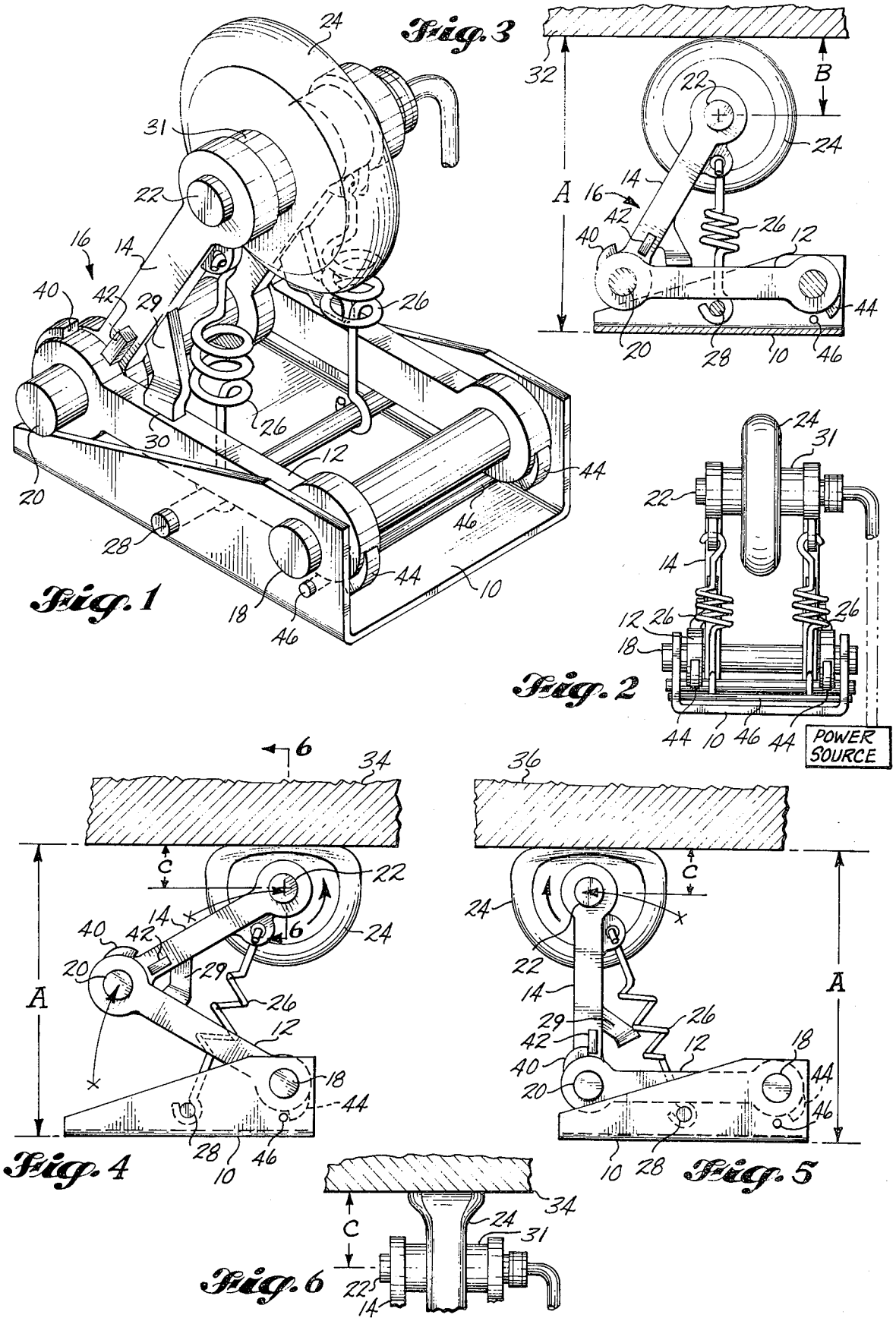

TRACTION-DEMAND POWER DRIVE UNIT

FIELD OF THE INVENTION

This invention relates to a powered roller drive unit for movement of large objects, such as cargo containers, over a conveying system; and, more particularly, to a self-elevating powered roller unit for movement of cargo over the deck of a cargo carrying aircraft.

BACKGROUND OF THE INVENTION

In modern cargo carrying aircraft, it is highly desirable to reduce the time required for loading and unloading of cargo containers. Accordingly, sophisticated powered roller drive systems have been designed to assist in the orderly automatic, or semi-automatic, flow of cargo onto the cargo deck and into a final stowed position. The cargo is normally packaged in specially designed containers or pallets, shaped to utilize the available space within the cargo compartment.

The powered drive rollers used in these systems are often termed "live" rollers, to distinguish them from the nonpowered or "dead" rollers, which are used in large numbers to support the cargo containers during transit into, and out of, the aircraft. In most systems, the live rollers are used sparingly in order to minimize the costs of the system. Typical dead rollers are metallic wheels or bearings, while live rollers are usually soft rubber or pneumatic tires for increased traction. In order to assure continuous movement of cargo, traction requirements for the live rollers must consider the maximum adverse slope of the deck when the aircraft is parked; both wet and dry conditions of the containers; and allow for sufficient accleration forces to obtain the proper velocity when the container starts from rest. Since the live rollers are soft and deformable under load, they obviously must be placed at a higher elevation than the dead rollers, which are rigid and will not deform under load. The live rollers are not designed to carry all of the vertical load, but only enough vertical load to develop sufficient traction forces when deformed to the level of the dead rollers.

In a typical installation of this type, the live rollers are placed approximately 0.75 inch above the dead rollers to allow sufficient deformation to obtain the required traction forces under the loads of the heavier, or maximum weight, cargo containers. However, a problem arises when lightly loaded containers are interspersed with the heavy containers, in that the live rollers do not deform significantly and the container is held above the elevation of the dead rollers, and is not properly supported. Such a lightly loaded container will occasionally hang up and get stuck against the guide means and/or vertical restraint means which are designed to accommodate containers at the level of the dead rollers. This problem disrupts orderly loading and unloading operations.

OBJECTS OF THE INVENTION

It is the primary object of this invention to provide, in an aircraft cargo loading system, a powered roller mechanism which will automatically place itself at a proper elevation with respect to the dead rollers to develop the proper normal force and traction to propel a variety of cargo containers having different weights.

It is a further object of this invention to provide, in a powered roller mechanism which incorporates an axially mounted motor for driving a pneumatic tire, a means for changing the elevation of the axle of the pneumatic tire to obtain a proper footprint area and traction force for a variety of containers having different weights.

SUMMARY

The above and other objects of this invention have been achieved in the mechanism of the disclosed preferred embodiment, in which a pneumatic tire type roller is driven by an axially mounted electric motor and supported by a broken-arm crank linkage. The linkage is spring biased in a first or unloaded position just slightly higher (e.g., ⅛ inch) than the dead rollers. The mechanism functions as follows: (1) When a lightly loaded container passes over the powered roller, the spring biasing holds the linkage in the first position and; (2) When a heavy container is encountered by the roller, sufficient traction is developed to overcome the biasing force and cause the broken arm crank linkage to pivot to a second position which places the axle of the tire closer to the container to thereby deform the tire and increase the traction force. The elevation of the container remains at the level of the dead rollers, but the powered roller takes a larger share of the vertical load of the container; and (3) When the heavy container moves past the powered roller, the spring biasing causes the linkage to return to its first, or unloaded, position.

BRIEF DESCRIPTION OF THE DRAWINGS

FIG. 1 is a perspective view of an embodiment of a traction demand power drive unit mechanism according to this invention, deployed in the unloaded position.

FIG. 2 is a rear elevation view of the mechanism of FIG. 1.

FIG. 3 is a side elevation view of the mechanism, deployed as in FIG. 1.

FIG. 4 is a side elevation view of the mechanism, deployed to drive a heavy cargo container to the left, as shown.

FIG. 5 is a side elevation view of the mechanism, deployed to drive a heavy container to the right, as shown.

FIG. 6 is a partial rear elevation view of the mechanism, showing the tire under heavy load.

DESCRIPTION OF THE PREFERRED EMBODIMENTS

FIG. 1 is a perspective view of the roller mechanism, which is installed by attachment of base 10 to an aircraft cargo deck in a path along which cargo containers are to be moved. A lower link 12 and an upper link 14 are connected to form a broken arm crank linkage 16 which is pivotally attached to base member 10 by pin 18 and pivotally interconnected by pin 20. The linkage 16 supports a fixed axle 22 on which the roller 24 is mounted for powered rotational movement. Biasing springs 26 hold link 12 of crank linkage 16 against stop pin 28, and stop lug 29 of link 14 against link 12 at 30, thereby holding the mechanism in a first, or unloaded, position. An electrically powered integral motor wheel 31, of a type known in the art and readily available from suppliers of cargo handling equipment, is rotatably mounted about fixed axle 22 and integrally attached to roller 24 for selectively driving the roller in either of two rotational directions upon energization from a power source.

FIG. 2 is a rear elevation view of the mechanism of FIG. 1, and schematically shows a power source connected to motor wheel 31. The outer cylindrical case of motor wheel 31 rotates and is driven by electromagnetic energy in a selected direction upon appropriate energization through a control panel (not shown).

FIG. 3 is a side elevation view illustrating the roller mechanism as it appears when propelling a lightly loaded container 32 in either direction. The base 10 is suitably attached to deck structure at a level A inches below the plane of the dead rollers (not shown). In systems of this type the dead rollers establish the elevation of the bottom of container 32; the primary function of the powered rollers 24 being to propel the container along its horizontal path. The roller 24 in the embodiment shown is a pneumatic tire. The dimension A is predetermined and established such that the top of the tire will be slightly above (e.g. 1/8 inch) the plane of the top of the dead rollers, in order that the tire will depress or flatten by up to this amount under the vertical load of a container. In this position, the tire has a rolling radius of B inches, and a lightly loaded container will be propelled by powered rotation. The mechanism will remain held in the FIG. 3 position by the biasing spring 26 after passing a lightly loaded container, and until a heavy container is encountered, in which case the tire will be fully depressed to the level established by the dead rollers, and a higher traction force will be developed. A traction force in either direction will generate a corresponding moment about pivot 18 or pivot 20 depending on the direction of rotation of the powered roller. This moment tends to work against and overcome the biasing moment applied by biasing spring 26. A traction force acting to move the container 32 to the right (clockwise powered rotation of roller 24) will tend to move the mechanism to the FIG. 5 position, and a traction force acting to move the container 32 to the left (counter-clockwise power rotation) will tend to move the mechanism to the FIG. 4 position.

FIG. 4 shows the mechanism propelling a heavy container 34 to the left as shown. It will be understood that the mechanism will move from the FIG. 3 position to the FIG. 4 position when a sufficient traction force (acting to the right as shown) is developed to create a moment about pivot pin 18 sufficient to overcome the biasing moment caused by spring 26. In FIG. 4, the axle 22 of the drive roller is at an elevation A minus C above the base, whereas in the first position shown in FIG. 3, the elevation of axle 22 was A minus B. Accordingly, the pneumatic tire roller 24 will be depressed to have a larger "footprint" with the container 34 and a decreased rolling radius C. This will enhance traction characteristics by providing more contact area and an increased traction force. The container will, of course, be propelled at a slower rate by virtue of the decreased rolling radius. It will be readily understood that the linkage system geometry may be adjusted to give virtually any change in elevation between the two positions shown in FIGS. 3 and 4. The elevation change (B minus C) for a typical installation may be of the order of 0.65 inch, although with the disclosed concepts any elevation change desired may be utilized depending on tire load and traction characteristics. It will further be understood that the specific mechanism and spring biasing system are schematic in nature and that optional expedients may be used. For example, the spring biasing system 26, 28 may be replaced by an air cylinder system, with or without viscous damping, to accomplish the same purpose, viz., to provide a resisting moment about the pivot pins 18 and 20.

It will be noted that in FIG. 4, stop means are provided to limit the angular displacement of the linkage in each of two opposite directions. A stop lug 44 integrally formed with link 12 has engaged a stop pin 46 integrally attached to the base 10. This, together with stop lug 29 acting on link 12 at 30 establishes the clockwise extent of travel of the mechanism, as shown in FIG. 4.

FIG. 5 shows the mechanism propelling a container 36 to the right as shown. It will be apparent that when the roller 24 is powered clockwise in the FIG. 3 position, and a heavy container moving to the right comes into contact with the roller, the traction forces will create a counterclockwise moment about pivot pin 20. When this moment reaches a sufficient value, it will overcome the biasing moment imposed by spring 26 and cause the upper link 14 of the mechanism to move in a counterclockwise direction about its pivot 20, until contact is made between the integral lug stop 40 (attached to link 12) and the stop lug 42 attached to upper link 14, as shown in FIG. 5. The mechanism will remain in this position until the traction force is no longer sufficient to overcome the biasing moment about pin 20, in which case it will tend to return to the FIG. 3 position. It will be noted that the geometry of the mechanism has been designed such that the rolling radius C in FIG. 5 is the same as the rolling radius C in FIG. 4, although for a special purpose a different rolling radius could be used.

FIG. 6 is a rear elevation view taken from FIG. 4, showing the increased footprint of the pneumatic tire roller 24 in either operative position in which a heavy container is to be driven.

The system of this invention will provide a suitable elevation for a powered roller for heavy and light containers to be driven in either direction and inherently applies a suitable traction force for either light or heavy containers. It is apparent that the mechanism has three basic positions, viz: The first or unloaded position of FIG. 3; the second, or left driving position of FIG. 4; and the third, or right driving, position of FIG. 5. However, it should also be recognized that all intermediate positions are inherently available and will be used. If the biasing system selected is, for example, an air cylinder with viscous damping, the mechanism should be stable within certain ranges at intermediate positions. Also, if desired, an additional primary position could be established by the provision of additional linkage and/or a more sophisticated biasing system. With the functional concepts disclosed here, the use of other types of mechanical linkages or over-center devices will readily occur to mechanical designers.

What is claimed and desired to be secured by United States Letters Patent is:

1. A powered drive roller mechanism for moving a cargo container or the like comprising:
   a base;
   a linkage means including a lower link pivotally attached to said base, and an upper link pivotally attached to said lower link;
   a powered roller mounted for rotation on said upper link, said roller having a first position for engagement with a lightly loaded container;

biasing means for urging said roller away from said container and for holding said roller in said first position;

wherein said linkage means is responsive to a predetermined traction force between said roller and said container to overcome said biasing means and pivot with respect to said base to move said roller in a direction opposite to the direction of movement of said container and into position of more forceful load engagement with said container.

2. The mechanism of claim 1 wherein said powered roller comprises an electrically powered integral motor wheel the outer cylindrical case of which is rotatably driven by electromagnetic energy.

3. The device of claim 1 wherein said powered roller is selectively reversible to move said container in either of two opposite directions.

4. A powered drive roller mechanism for moving a cargo container or the like comprising:

a roller means for applying a traction force to said cargo container;

a power means for rotating said roller means;

a base;

a linkage mounted on said base for supporting said roller means having two pivotal points about either of which said roller means can move from a first position for use with a light container into a position of more forceful engagement with a heavier container in response to the traction force necessary to propel said heavier container, the pivot point about which said roller means moves being dependent on the direction of travel of said container; and a biasing means for urging said roller away from said container and into said first position.

5. The device of claim 4 wherein said power means comprises an electrical motor mounted within said roller means.

6. The device of claim 5 wherein said roller means comprises a pneumatic tire.

7. The device of claim 4 wherein said power means is selectively reversible to rotate said roller in either of two opposite directions.

* * * * *